US 009848405B2

(12) United States Patent
Dinan

(10) Patent No.: US 9,848,405 B2
(45) Date of Patent: Dec. 19, 2017

(54) SYSTEM AND METHOD FOR PAGING CYCLE MANAGEMENT IN A WIRELESS NETWORK

(75) Inventor: Esmail Dinan, Herndon, VA (US)

(73) Assignee: CLEARWIRE IP HOLDINGS L.L.C., Bellevue, WA (US)

( * ) Notice: Subject to any disclaimer, the term of this patent is extended or adjusted under 35 U.S.C. 154(b) by 1090 days.

(21) Appl. No.: 12/819,887

(22) Filed: Jun. 21, 2010

(65) Prior Publication Data

US 2011/0312347 A1    Dec. 22, 2011

(51) Int. Cl.
*H04W 68/02*    (2009.01)

(52) U.S. Cl.
CPC ................................. *H04W 68/02* (2013.01)

(58) Field of Classification Search
USPC .... 455/458, 426.1, 515, 520, 518, 567, 434, 455/553.1
See application file for complete search history.

(56) References Cited

U.S. PATENT DOCUMENTS

| 5,541,976 | A  | * | 7/1996  | Ghisler  | 455/426.1 |
| 6,728,300 | B1 | * | 4/2004  | Sarkar   | H04W 68/025 340/7.28 |
| 8,260,270 | B2 | * | 9/2012  | Yoon     | H04W 24/02 455/414.1 |
| 2003/0008691 | A1 | * | 1/2003 | Chen     | H04W 68/00 455/574 |
| 2003/0199272 | A1 | * | 10/2003 | Shvodian et al. | 455/434 |
| 2006/0025161 | A1 | * | 2/2006  | Funato et al. | 455/458 |
| 2006/0089161 | A1 | * | 4/2006  | Kim et al. | 455/458 |
| 2006/0189332 | A1 | * | 8/2006  | Benco et al. | 455/458 |
| 2007/0087767 | A1 | * | 4/2007  | Pareek et al. | 455/502 |
| 2008/0188247 | A1 | * | 8/2008  | Worrall | 455/458 |
| 2008/0188248 | A1 | * | 8/2008  | Willey | H04W 68/025 455/458 |
| 2009/0143072 | A1 | * | 6/2009  | Montojo et al. | 455/450 |
| 2010/0137007 | A1 | * | 6/2010  | Kojima | 455/458 |
| 2010/0159959 | A1 | * | 6/2010  | Santhanam et al. | 455/458 |
| 2010/0255860 | A1 | * | 10/2010 | Ji | 455/458 |
| 2011/0051668 | A1 | * | 3/2011  | Lee et al. | 370/328 |

* cited by examiner

*Primary Examiner* — Larry Sternbane
*Assistant Examiner* — William Lu

(57) ABSTRACT

A system to control paging cycles in a wireless network assigns mobile stations to one of a plurality of paging groups based on the paging cycle requirements of the individual mobile stations. In addition, the mobile stations in a particular paging group are further subdivided into subgroups that may be substantially equal in size. At any particular paging cycle, only one subgroup of a particular paging group is included in the paging process thus reducing the overall number of mobile stations that need to be paged in any particular paging cycle.

38 Claims, 7 Drawing Sheets

FIG. 6

- 1000 MOBILE STATIONS WITH PAGING CYCLE = 0.5 SEC: GROUP 1: 1000 MS
- 1500 MOBILE STATIONS WITH PAGING CYCLE = 1 SEC: GROUP 2, SUBGROUP 1: 750 MSs | GROUP 2, SUBGROUP 2: 750 MSs
- 1200 MOBILE STATIONS WITH PAGING CYCLE = 2 SEC: G3, SG1: 300MSs | G3, SG2: 300MSs | G3, SG3: 300MSs | G3, SG4: 300MSs
- 2000 MOBILE STATIONS WITH PAGING CYCLE = 4 SEC: G4, SG1: 250MSs | G4, SG2: 250MSs | G4, SG3: 250MSs | G4, SG4: 250MSs | G4, SG5: 250MSs | G4, SG6: 250MSs | G4, SG7: 250MSs | G4, SG8: 250MSs

SYSTEM AND METHOD FOR PAGING CYCLE MANAGEMENT IN A WIRELESS NETWORK

BACKGROUND OF THE INVENTION

Field of the Invention

The present invention is directed generally to mobile communication networks and, more particularly, to a system and method for controlling paging cycles in a wireless network.

Description of the Related Art

Wireless devices, such as cell phones, mobile computers, and the like, communicate with a network using a wireless connection between the wireless device and some form of wireless interface, such as a base station, wireless gateway, access point, or the like. The wireless device is said to be in the "wake mode" when it is registered with the network and is actively transmitting and/or receiving data.

To conserve battery power, the network can allow a wireless device to go into an "idle mode" or sleep mode if the wireless device is inactive for a predetermined period of time. While operating in an idle mode, the wireless device generally powers down transmitters and receivers to conserve battery power. However, the wireless device activates periodically to check for any incoming transmissions.

In a typical embodiment, a base station periodically transmits paging data to indicate to a particular wireless device that downlink traffic is available for the wireless device. When the wireless device periodically becomes active, it detects the paging message and reenters the wake mode to actively communicate with the wireless network once again.

Those skilled in the art will appreciate that a large traffic volume will result in a correspondingly large number of paging message from a base station. In addition to communication congestion and delays caused by a large number of paging message, the call set-up time for wireless devices reentering the wake mode further increases the possibility of congestion in the wireless network. Therefore, it can be appreciated that there is a significant need for a system and method to control paging in a wireless network. The present disclosure is directed to techniques to provide this, and other advantages, as will be apparent from the following detailed description and accompanying figures.

BRIEF DESCRIPTION OF THE SEVERAL VIEWS OF THE DRAWING(S)

FIG. 6 illustrates an example assignment of mobile stations into multiple paging groups and multiple subgroups.

DETAILED DESCRIPTION OF THE INVENTION

The present disclosure is directed to a system and method for assigning mobile stations to paging groups and subgroups to minimize the number of mobile stations that may be paged in any given paging cycle. The process supports variable paging cycles that may be specified by either the mobile station or the base station. In one embodiment, the paging cycle requirements may be dictated by a particular application running on the mobile station. For example, the transmission of a data file to a mobile station, such as a peer-to-peer transmission has little or no delay sensitivity. A mobile station operating in this mode can be paged less frequently than, for example, a mobile station engaged in push-to-talk wireless communication. Similarly, on-line game applications may also have greater sensitivity to delays and thus operate with shorter paging cycles.

Figure 1:
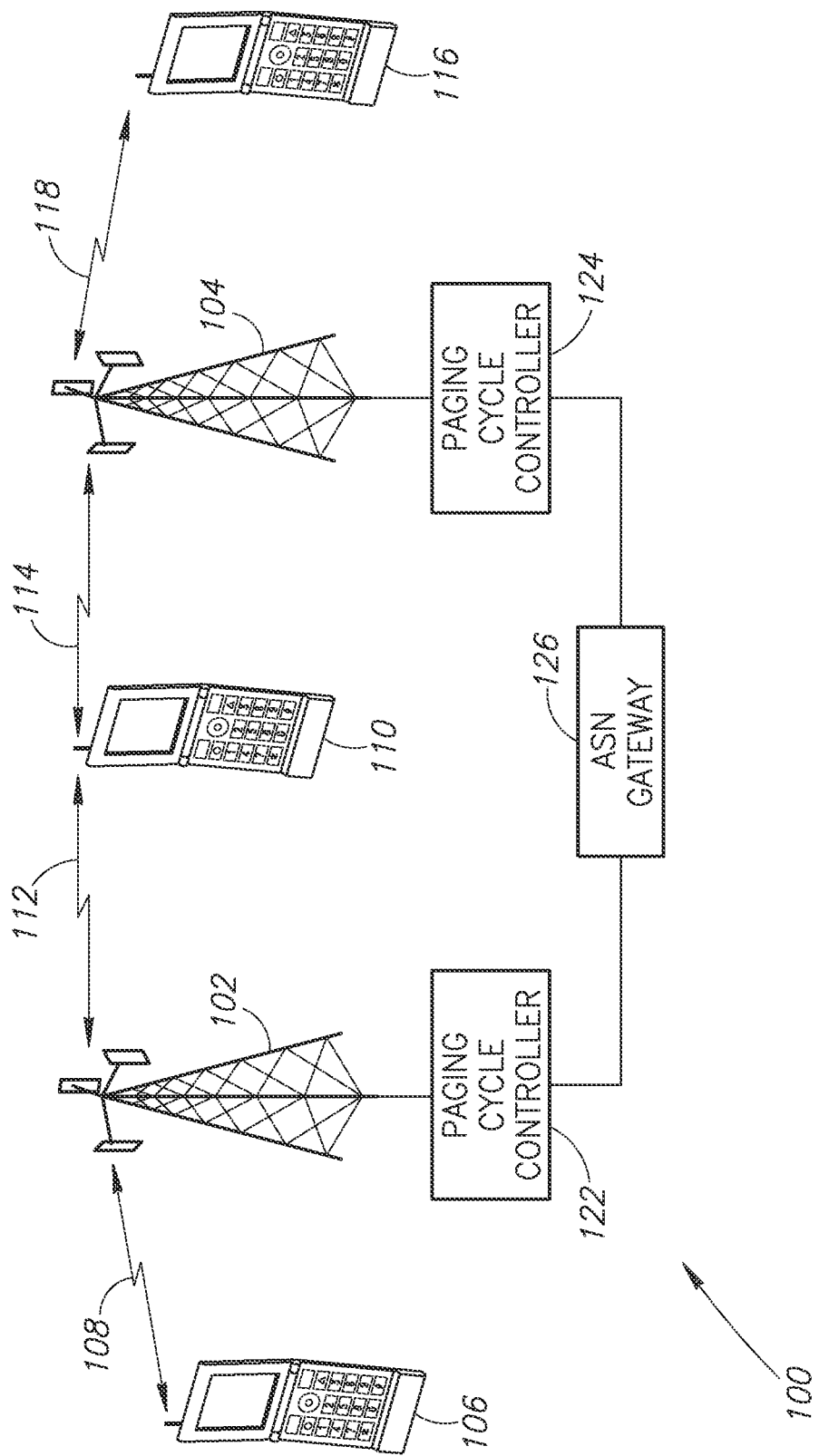
FIG. 1 is a diagram illustrating an example wireless architecture configured in accordance with the present disclosure.

The present disclosure may be implemented in a system 100 illustrated in the simplified system architecture of FIG. 1. FIG. 1 illustrates a base station (BS) 102 and a BS 104 that each communicate with a number of mobile stations. For example, the BS 102 communicates with a mobile station (MS) 106 via a wireless communication link 108 and communicates with a MS 110 via a wireless communication link 112. Further, the BS 104 may also communicate with the MS 110 via a communication link 114. FIG. 1 also illustrates the BS 104 communicating with a MS 116 via a communication link 118. Those skilled in the art will appreciate that a typical implementation will include a larger number of base stations and many more mobile stations than those illustrated in the simplified diagram of FIG. 1.

The operation of the base station and the mobile stations to communicate with each other is well known in the art and need not be described in greater detail herein. Furthermore, while the examples presented herein are directed to a WiMAX, the teachings contained herein are readily applicable to any wireless communication system that supports variable paging cycles. For example, long term evolution (LTE) technology supports variable paging and can be implemented in accordance with the present teachings.

FIG. 1 illustrates paging cycle controllers 122-124 for the BS 102 and the BS 104, respectively. As will be discussed in greater detail below, the paging cycle controllers 122-124 assign mobile stations entering an idle mode to a particular paging group. Furthermore, the paging cycle controllers 122-124 may assign the mobile stations in a particular paging group to one of a plurality of paging subgroups. The assignment to groups and subgroups will be discussed in greater detail below.

The base stations 102-104 are coupled to an access service node (ASN) gateway 126 via backhaul communication links. In other wireless implementations, the ASN gateway 126 may be referred to as a serving gateway. The ASN gateway 126 may serve as the controlling point between the core wireless network and a plurality of base stations (e.g., the BS 102 and the BS 104). In a GMS network, the ASN gateway 126 may be referred to as a base station controller. Alternatively, each base station (e.g., the BS 102 and the BS 104) may be controlled by individual base station controllers that, in turn, are controlled by a centralized control element (not shown) in the wireless network.

The paging cycle controllers 122-124 may be implemented by a microprocessor, microcontroller, or the like (not shown). In addition, the paging cycle controllers 122-124 include memory (not shown), which may include both read-only memory and random access memory. The paging cycle controllers 122-124 may be implemented using a conventional PC or a single processor board, as is known in the art. In addition, the paging cycle controllers 122-124 may contain a memory storage device, such as disk drive, optical drive, or the like. In operation, the paging cycle controllers 122-124 may contain a database or other suitable data storage structures to store information regarding paging groups and subgroups, as will be described in greater detail below. In one embodiment, the ASN gateway 126 may store information regarding the paging groups and subgroups. As is known in the art, the ASN gateway 126 stores status information for each of the mobile stations. That is, the ASN gateway 126 knows whether a particular mobile station (e.g., the MS 116) is in the awake or active state or in the idle state. In addition, the ASN gateway 126 stores subscriber device identification data for each of the mobile stations. A MAC ID is one example of a subscriber device ID. Because the ASN gateway 126 already stores status data and identification data (e.g., the subscriber device ID) for mobile stations, the paging cycle controllers 122-124 could be conveniently implemented as a single paging cycle controller within the ASN gateway 126. In yet another embodiment, the paging cycle controllers 122-124 could be implemented in another network node, such as a centralized control element.

As discussed above, it is desirable for a mobile station to enter the idle mode if it is inactive. This conserves battery power and reduces congestion on the wireless network. The mobile station may initiate the entry into idle mode if it is inactive for a Time_Idle time, which is generally configurable within each mobile station. Alternatively, the base station (e.g., the BS 102) may also initiate the entry of a mobile station into the idle mode following a period of inactivity. While in the idle mode, the mobile station periodically becomes active to check for downlink traffic messaging. This process is sometimes referred to as paging. In WiMAX, paging can be accomplished without the MS being registered with a specific base station.

Figure 2:
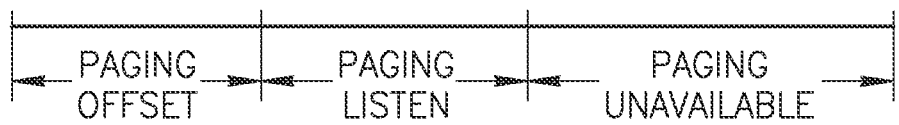
FIG. 2 illustrates a timing diagram for a conventional paging cycle in a typical wireless network.

In WiMAX, data frames are 5.0 milliseconds in duration. Those skilled in the art will appreciate that the present teachings may be applied to wireless systems that may have different frame durations. In accordance with an exemplary WiMAX implementation, every X data frames is a paging frame where a value for X is selected by the wireless network operator to provide a minimum paging cycle time. For example X=100 will result in paging cycles every 0.5 seconds. This value can be varied by the network operator. FIG. 2 illustrates the structure of a data frame used in a paging cycle. A paging offset is simply a time offset from the beginning of the paging frame to the transmission of paging information. In an exemplary embodiment, the paging offset may be set to zero. During a "paging listen" portion of the paging cycle, idle mobile stations temporarily awaken to listen and thereby determine whether there is downlink data available for the mobile station. At the end of the paging listen portion of the paging data frame, paging is unavailable and any idle mobile stations will remain in idle mode if there was no paging for that mobile station. If a paging message is transmitted for that particular mobile station, its reenters the awake mode and establishes a communication link with a base station to receive the downlink traffic.

Figure 3A:
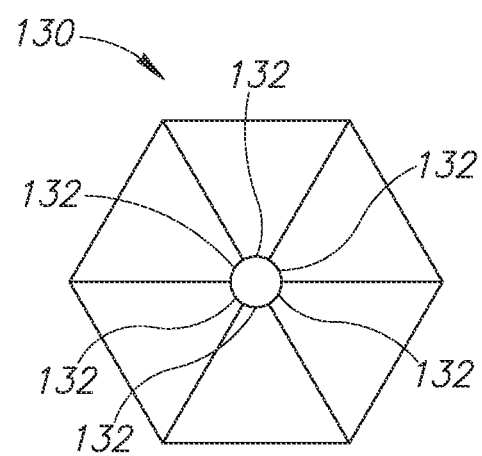
FIG. 3A illustrates a sample cell layout.

A wireless communication network comprises a plurality of base stations arranged in a repeated pattern of cells to provide wireless coverage over a wide geographic region. FIG. 3A illustrates a single cell 130 that is covered by six base stations 132. Those skilled in the art will appreciate that prior technology descriptions would describe the transceiver at the center of the cell 130 as a base station and multiple sectors as areas of coverage provided by the central base station. Thus, the sectors in FIG. 3A may have previously been identified as sectors of a centralized base station. However, because the central base station effectively processes each sector independently as a separate area of coverage, the current terminology refers to the functionality in which the radio transceiver for each sector may now be referred to as a base station 132.

Figure 3B:
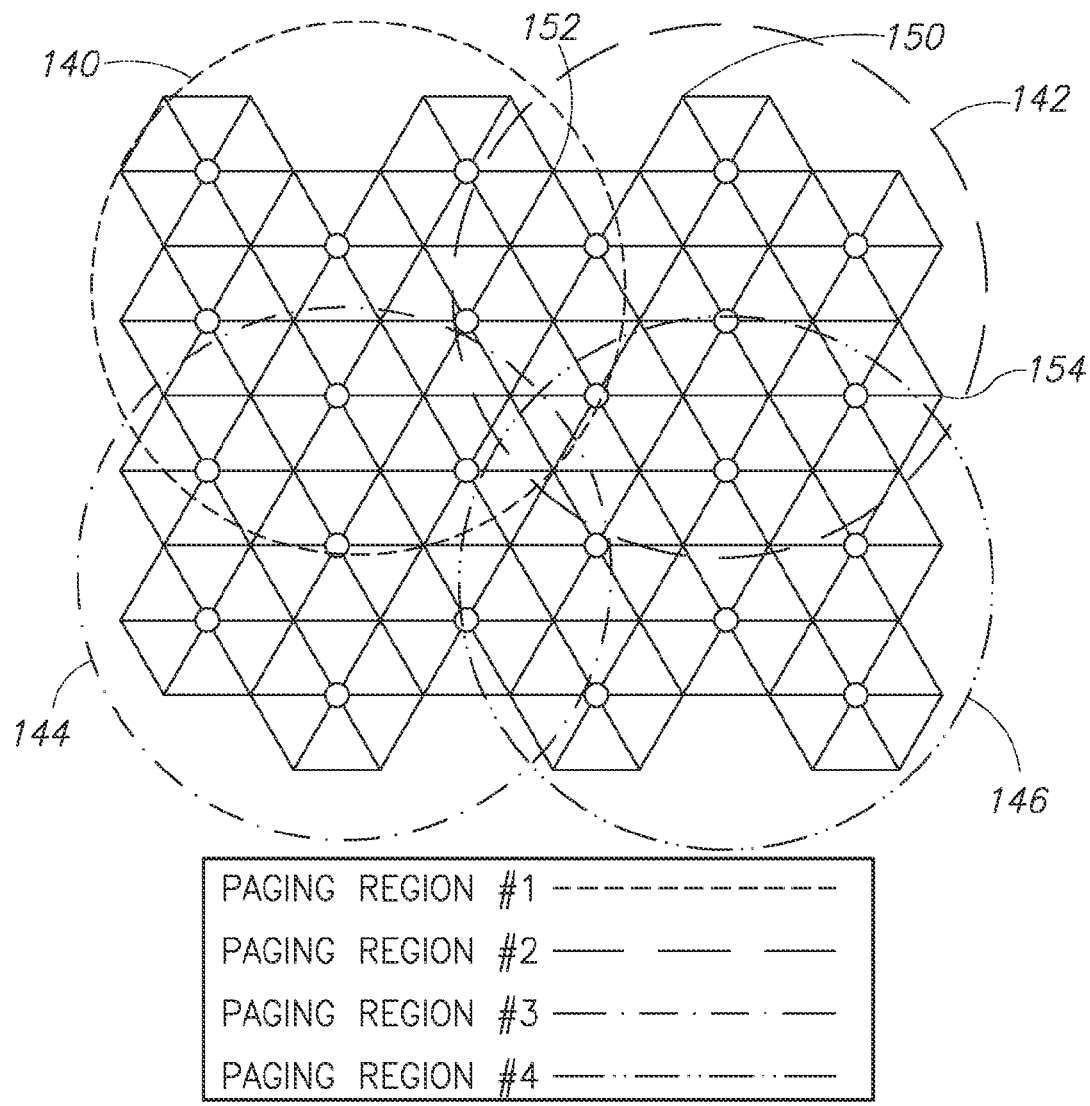
FIG. 3B illustrates a sample cell layout and the aggregation of multiple cells into paging groups.

Mobile stations may roam from one cell to another. To accommodate movement of mobile stations throughout the network, the system 100 organizes multiple base stations into paging regions. Typically, the mobile station has registered with a base station, which may be considered its anchor base station. FIG. 3B illustrates a simplified arrangement of paging regions. FIG. 3A illustrates paging region one 140, paging region two 142, paging region three 144, and paging region four 146. Each paging region contains a number of base stations and base stations may belong to one or more paging regions.

For example, a cell 150 is contained wholly within paging region two 142. In contrast, a cell 152 is within both the paging region one 140 and the paging region two 142 while a cell 154 is contained within the paging region two 142 and the paging region four 146. All of the base stations in the system 100 transmit paging data frames at the same time. During a paging cycle, all base stations for cells within a particular paging region transmit the same paging data. That is, all of the base stations in paging region four 146 will transmit the same paging data. If the mobile station was previously registered to a base station that is contained within two paging regions, both paging regions will include that mobile station in its paging data. For example, the cell 152 is contained within both the paging region one 140 and the paging region two 142. If a particular mobile station was previously registered with a base station in the cell 152, the base stations in both paging regions (i.e., the paging region one 140 and paging region two 142) will page that particular mobile station. As is known in the art, if a mobile station does not respond to a paging message broadcast in a particular paging region, the system will expand the number of paging regions in the next paging cycle in an effort to locate the mobile station.

In accordance with WiMAX protocols, a mobile paging advertisement (MOB_PAG_ADV) message is transmitted from all base stations in the paging group to inform an idle mobile station of pending downlink traffic. As it is known in the art, the MOB_PAG_ADV will contain the subscriber device ID for any mobile station receiving downlink traffic. Upon receipt of the MOB_PAG_ADV message, a mobile station having downlink traffic responds by performing a network reentry process with the base station and transitioning to the active or awake mode.

In traditional wireless networks, such as 2G and 3G networks, there is only one paging cycle across the entire network. With newer technologies, such as WiMAX and LTE, each mobile station can specify its own paging cycle. As described above, the mobile station may specify a paging cycle based on its present operations. Thus, the mobile station may request an application-specific paging cycle. In another embodiment, the paging cycle may be based on the type of mobile station or simply upon request by the mobile station. In any of these embodiments, the base stations within a paging region (e.g., the paging region one 140; see FIG. 3B) send a paging MOB_PAG_ADV message at paging intervals based on the device and/or application-specific paging cycle requirements.

Those skilled in the art will appreciate that having many individually specified paging cycles can complicate management of idle subscribers at the base station and may dramatically increase paging signaling overhead if the base station wants to guarantee the paging cycle for all mobile stations. The base station may be required to transmit more MOB_PAG_ADV messages based on the mobile or application-specific paging cycle to accommodate all the mobile station paging requirements.

Figure 4:
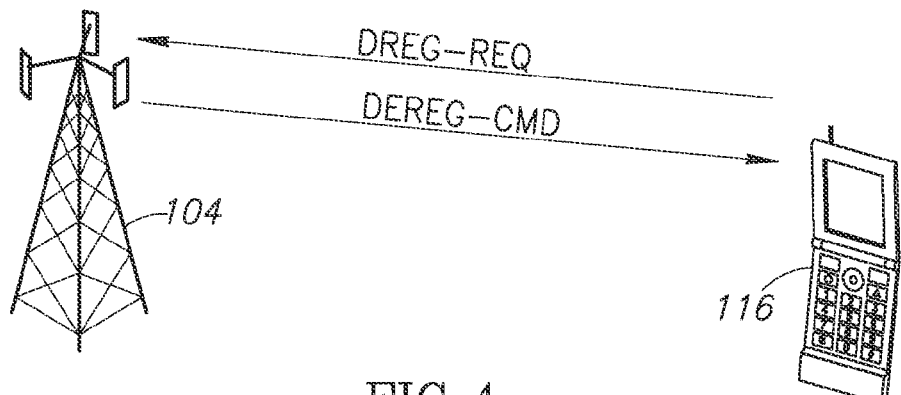
FIG. 4 illustrates a message exchange between a base station and a mobile station to establish a paging cycle.

FIG. 4 illustrates the communication messaging between the BS 104 and the MS 116 to initiate entry into the idle mode. If the MS 116 initiates the idle mode entry, a requested paging cycle value is sent by the MS in a de-registration request (DREG-REQ) message. The BS 104 may chose to apply the requested paging cycle value (or a value close to the requested paging cycle value) or may impose a different paging cycle value in a deregistration command (DREG-CMD) message. If the BS 104 initiates the idle mode entry, a fixed paging cycle value is sent to the MS 116 in the deregister-command (DREG-CMD) message.

Figure 5:
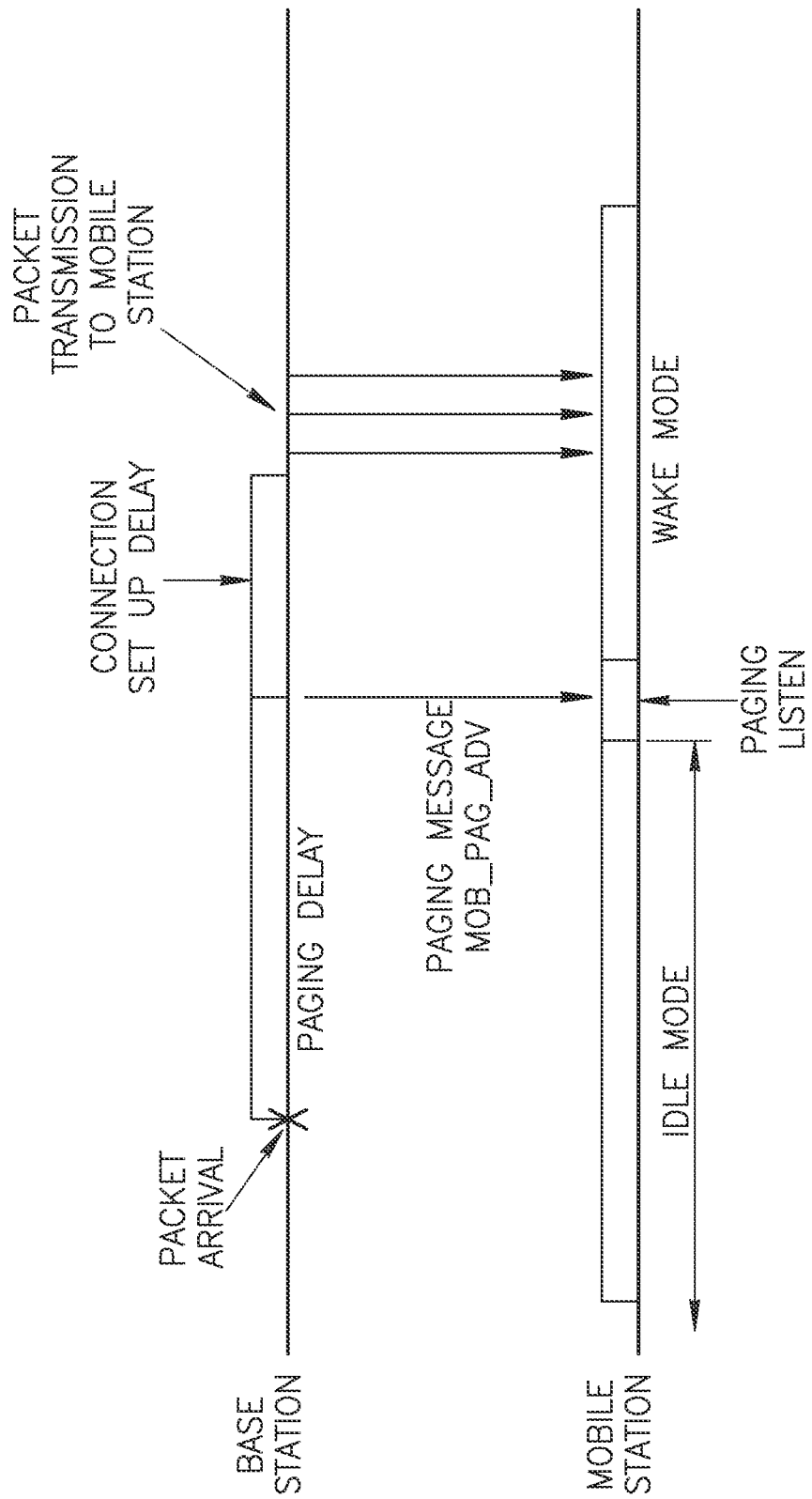
FIG. 5 is a timing chart illustrating operation and interaction between a base station and a mobile station.

FIG. 5 illustrates timing and message exchange between the base station (e.g., the BS 104) and the mobile station (e.g., the MS 116). The timing diagram of FIG. 5 is intended for illustrative purposes only and is not drawn to scale. That is, the timing diagram is intended to illustrate the sequence of messages and actions by the base station and the mobile station. It is not intended as an accurate depiction of actual timing or relative duration of the sequence of activities. At the top of FIG. 5, a data packet arrives for the MS 116. Depending on the arrival time of the data packet, there is a paging delay between the arrival time of the data packet and the transmission of the MOB_PAG_ADV message transmitted by the BS 104. The MS 116 is in a low power idle mode until a predetermined time during which it awakens to listen for paging messages. As illustrated in FIG. 5, at some point during the paging listen period, the MS 116 receives the MOB_PAG_ADV message indicating that there is downlink traffic for the mobile station. The MS 116 makes a transition to the wake mode and begins to establish a connection. Under WiMAX protocol, the MS 116 transmits a ranging request (RNG-REQ) message to enter the awake mode and register with a base station. Based on the results of the RNG-REQ message, the MS 116 will register with the base station providing the strongest signal. This may not be the base station with which the mobile station was previously registered prior into entry into the idle mode. The MS 116 must also carry out other network entry procedures, such as registration, authentication, and IP address assignment. This period of time is indicated at the BS 104 as a connection set up delay. The connection delay depends on the number of mobile stations that perform initial ranging at the same time. As is known in the art, the initial RNG-REQ message is transmitted using a random access channel with the possibility of packet collision. If too many mobile stations are paged at the same time, the connection set up delay will increase. Following the completion of the connection set up, the BS 104 transmits packets to the MS 116, which is now in the wake mode.

Those skilled in the art will appreciate that there are tradeoffs to the paging cycle values used within the system 100. If a high paging cycle (i.e., less frequent paging) is implemented, there will be a long idle mode response time for downlink traffic. In addition, the base station must have sufficient memory and be handle the memory usage required by buffering incoming traffic that is stored for each mobile station in the idle mode. In contrast, if a low paging cycle value (i.e., more frequent paging) is implemented in the system 100, mobile stations will waste battery power. In addition, frequent paging cycles will require a greater paging cycle signaling overhead.

The system 100 helps minimize the paging cycle overhead and connection set up delays by organizing mobile stations into paging groups based on the paging cycle request times. The system 100 further organizes mobile stations within a particular paging cycle into sub-groups to minimize the number of mobile stations that are paged in any given paging cycle.

The minimum paging cycle time may be selected by the wireless network provider based on overall network considerations. For purposes of presented an example herein, a minimum paging cycle (Min_Paging_Cycle) of 0.5 seconds is presented. In an exemplary embodiment, the BS 104 will allow paging cycle values that are $2^k$ product of the minimum paging cycle value. Thus, the available paging cycles are given by the following equation:

$$\text{Paging Cycle} = 2^k \times \text{Min\_Paging\_Cycle, where } k = 0, 1, 2, \ldots, N.$$

FIG. 6 illustrates the activity of the paging cycle controller 124 (see FIG. 1) in assigning mobile stations to groups and subgroups. Using the example of Min_Paging_Cycle=0.5 seconds and a value of N=3, the BS 104 has allowable paging cycle values of 0.5, 1.0, 2.0, and 4.0 seconds.

Under this grouping arrangement, mobile stations having time delay sensitivity are assigned the lowest paging cycle value (i.e., 0.5 seconds) and can be paged at every paging cycle. Those mobile stations are designated herein as paging group one. In the example of FIG. 6, 1000 mobile stations are assigned a paging cycle of 0.5 seconds. In paging group two, 1500 mobile stations having a paging cycle value of 1.0 seconds are designated as paging group two. However, the mobile stations in paging group two are further divided into subgroups one and two. In one embodiment, the paging cycle controller 124 (see FIG. 1) subdivides the mobile stations in paging group two into two subgroups of approximately equal size. Thus, approximately 750 mobile stations are assigned to each of the two subgroups in the example of FIG. 6. Instead of paging all members of paging group two at every other paging interval, the BS 104 alternately pages one of the subgroups in paging group two at each paging interval. For example, in the first paging interval, all members of paging group one are paged. In addition, the members of paging group two, subgroup one are paged. At the next subsequent paging cycle, all members of paging group one are paged. In addition, all the members of paging group two, subgroup two are paged. Thus, the paging cycle requirements for all members of paging group one are met (i.e., paging cycle=0.5 seconds). In addition, the paging cycle requirements for all members of paging group two are met (i.e., paging cycle=1.0 seconds), but the BS 104 is only required to send paging messages to half the mobile stations in paging group two at any given paging cycle.

Continuing with the present example, a group of mobile stations requiring a 2.0 seconds paging cycle are organized by the paging cycle controller 126 (see FIG. 1) into a group designated as paging group three. In addition, the paging cycle controller 124 subdivides the members of paging group three into four different subgroups. In one embodiment, the paging cycle controller 124 creates the four subgroups of approximately equal size.

In the example of FIG. 6, 1200 mobile stations are assigned to paging group three with approximately 300 mobile stations in each of the four subgroups. With the members of paging group three, one of the four subgroups is paged at each paging cycle. Because there are four subgroups, the individual mobile stations within a particular subgroup will be paged every four paging cycles (i.e., 4×0.5 sec=2.0 sec). Thus, each of the mobile stations in paging group three achieves the desired paging cycle while a minimum number of mobile stations in paging group three is paged in any individual cycle.

This process continues in the present example with a group of mobile stations having a paging cycle of 4.0 seconds. The paging cycle controller 124 (see FIG. 1) organizes these mobile stations into paging group four with the designated paging cycle of 4.0 seconds. The paging cycle controller 124 further organizes the mobile stations in paging group four into eight subgroups. In one embodiment, the paging cycle controller 124 creates the eight subgroups of approximately equal size. In the example of FIG. 6, 2000 mobile stations are assigned to paging group four with each of the eight subgroups in paging group four including approximately 250 mobile stations. During any particular paging cycle, one of the eight subgroups in paging group four is included in the paging. In the next paging cycle, the next subgroup in paging group four is paged. Because there are eight subgroups in paging group four, each of the subgroups will be paged every 8 paging cycles (i.e., 8×0.5 sec=4.0 sec). Thus, each individual mobile station within paging group four maintains its desired paging cycle of 4.0 seconds while a minimum number of mobile stations in paging group four is paged in any individual paging cycle.

Figure 7:
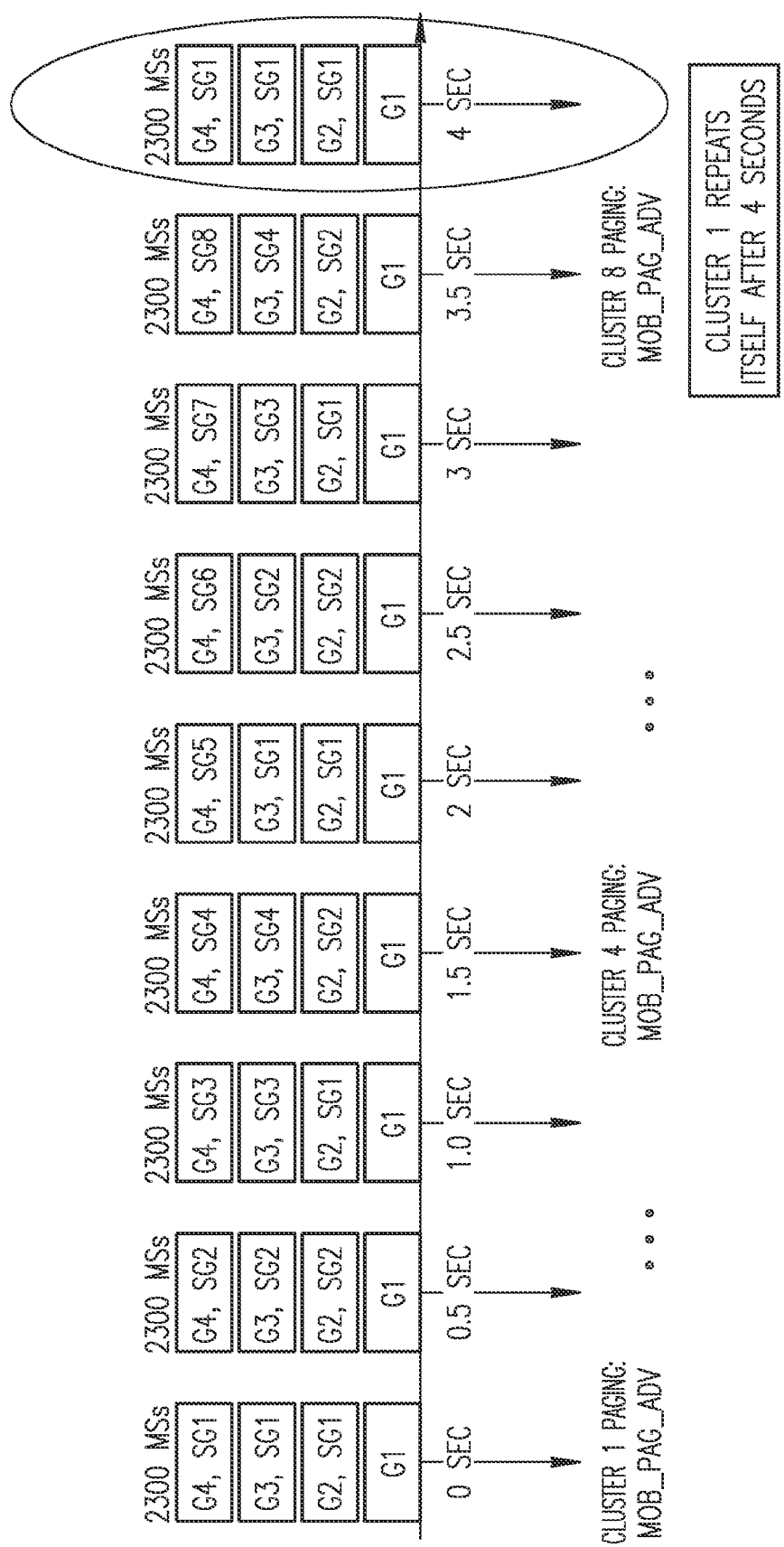
FIG. 7 is a timing diagram illustrating paging for clusters of mobile stations.

FIG. 7 graphically illustrates the paging cycle process in the example presented herein. The mobile stations are clustered together based on their groups and subgroups. Continuing with the example of Min_Paging_Cycle=0.5 sec and N=3, there are eight paging clusters formed by the paging cycle controller 124 (see FIG. 1). The mobile stations in the individual clusters are paged during sequential paging cycles. In the example presented herein, cluster 1 includes the mobile stations from paging group one. As discussed above, there are no subgroups in paging group one as each mobile station in group one must be paged at the Min_Paging_Cycle of 0.5 sec in the present example. Cluster one also includes subgroup one of paging group two, subgroup one of paging group three, and subgroup one of paging group four. Similarly, cluster two includes all of the mobile stations from paging group one, subgroup two of paging group two, subgroup two of paging group three, and subgroup two of paging group four. Cluster three includes all of the mobile stations from paging group one, subgroup one of paging group two, subgroup three of paging group three, and subgroup three of paging group four. Note that the cycle has begun to repeat for paging group two. That is, subgroup one of paging group two is included in cluster three thereby providing the necessary paging cycling required for the mobile stations in paging group two. This process continues until cluster eight, which includes all of the mobile stations from paging group one, subgroup two from paging group two, subgroup four from paging group three, and subgroup eight from paging group four. At the next successive paging cycle, the mobile stations in cluster one are paged again and the process repeats itself. Thus, each mobile station has the desired paging cycle intervals.

The paging cycle controller 124 (see FIG. 1) may store the list of mobile stations in their associated cluster. At each appropriate paging cycle time, the paging cycle controller 124 provides the cluster list to the appropriate base stations in each paging region. In the example illustrated in FIG. 7, cluster 1, with the groups and subgroups described above are in the first paging cycle occurring at 0 sec. Cluster two is paged at the next paging cycle (i.e., 0.5 sec). Cluster three is paged at the next successive paging cycle (i.e., 1.0 sec) and so forth. At four seconds, cluster one is paged again and the cycle repeats itself.

With the example number of mobile stations described above, each paging cycle includes 2,300 mobile stations. Without the subgrouping described herein, the number of mobile stations in a particular paging cycle would vary wildly from 1,000 mobile stations (i.e., the mobile stations of paging group one) every other paging cycle to as many as 5,700 mobile stations in paging cycle eight (i.e., all of the mobile stations of groups 1-4). Those skilled in the art will appreciate that paging data is transmitted only for the mobile stations that have downlink traffic. Thus, there may be greater or fewer mobile stations paged in any particular paging cycle. The arrival of downlink data for a particular mobile station is unpredictable. However, the load-balancing approach taken in the system 100 will cap the number of mobile stations that could receive a paging message in any particular paging cycle and tends to average out the number of mobile stations paged at any particular paging cycle.

Those skilled in the art will appreciate that the subgrouping example presented in FIGS. 6 and 7 have an equal number of mobile stations assigned to each subgroup. However, it is not necessary that the mobile stations be precisely divided into equal numbers in each subgroup. For optimal operation, the subgroups contain approximately the same number of mobile stations.

Furthermore, the number of subgroups need not be a binary number based on the equation provided above. For example, a network service provider could implement a paging cycle having four paging cycle values. If the minimum paging cycle is set to 0.5 seconds, a service provider could implement other paging groups having 1.0 seconds, 1.5 seconds, and 2.0 seconds. For paging group one, there are no subgroups for the reasons discussed above. That is, each of the mobile stations in paging group one must be paged at the minimum paging cycle interval. Paging group two can be subdivided into two subgroups, paging group three can be subdivided into three subgroups and group four can be subdivided into four subgroups. The clustering occurs in a manner similar to that described above. For example, the first cluster would include all the mobile stations of paging group one, the mobile stations in subgroup one of paging group two, the mobile stations in subgroup one of paging group three, and the mobile stations in subgroup one of paging group four. Cluster two in this example includes all the mobile stations in group one, the mobile stations in subgroup group two of paging group two, the mobile stations in subgroup two of paging group three, and the mobile stations in subgroup two of paging group four. The pattern continues with each subgroup being paged at appropriate intervals to meet the paging cycle requirements of the mobile stations in each of those subgroups. In this particular example, the cluster pattern is repeated after twelve paging cycles. In addition, those skilled in the art will appreciate that a network provider may choose a minimum paging cycle other than 0.5 seconds.

Figure 8:
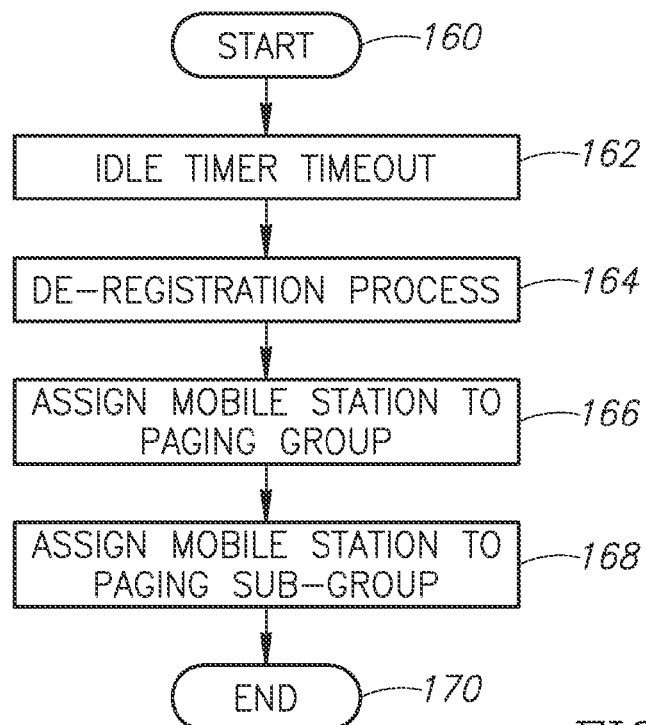
FIG. 8 is a flowchart illustrating the operation of the system to assign mobile stations to paging groups and subgroups.

FIG. 8 is a flowchart illustrating the operation of the system 100 to assign mobile stations to a paging group and subgroup. At a start 160, a mobile station is in the active or awake mode. At step 162, an idle timeout occurs. As discussed above, the timeout may be measured by the mobile station (e.g., the MS 116) or the base station (e.g., the BS 104).

In step 164, the de-registration process occurs. If the idle timeout in step 162 occurred in the MS 116, the MS 116 sends a de-registration request (DREG-REQ) message to the BS 104, as illustrated in FIG. 4. The DREG-REQ message will typically contain a request for a particular paging cycle. As previously discussed, the requested paging cycle may be based on the mobile station itself (e.g., the type of device), an application being executed by the mobile station, a combination of these factors, or the like. In response to the DREG-REQ message, the BS 104 transmits a de-registration command (DREG-CMD) message to the MS 116 indicating the assigned paging cycle. The BS 104 may also send this information to other base stations in the paging region.

The paging cycle controller 124 (See FIG. 1) assigns the mobile station to a particular paging group in step 166. In step 168, the paging cycle controller 124 assigns the mobile station to a particular paging subgroup and the process ends at 170. As discussed above, the paging cycle controller 124 may optimize system operation by assigning mobile stations to subgroups so as to maintain approximately equal numbers of mobile stations in each of the subgroups of any particular group. The paging cycle controller 124 may include other factors in the determination of the assignment of a mobile station to a particular subgroup. While balancing the overall numbers of mobile stations within each subgroup is a primary function of the paging cycle controller 124, distance from the base station may also be a factor. Mobile stations closer to a base station will require less power transmitted from the base station for suitable reception. Other factors, such as signal coverage quality or even the type of device or application may be a factor. For example, the paging cycle controller 124 may place all mobile stations of a particular type into a single subgroup within a paging group.

Figure 9:
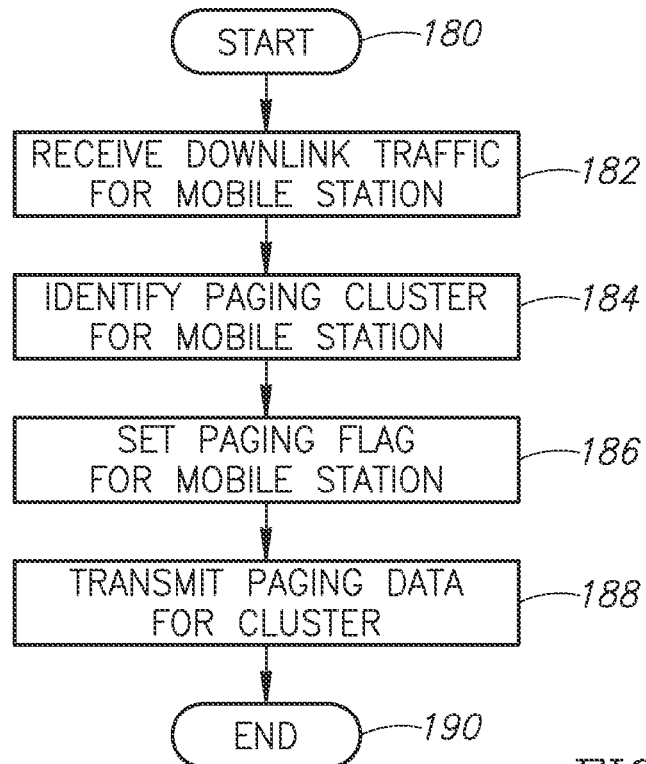
FIG. 9 is a flowchart illustrating the operation of a system to page mobile station within designated paging groups and subgroups.

FIG. 9 is a flowchart illustrating the operation of the system 100 in paging the individual mobile stations. At a start 180, one or more mobile stations are in an idle or sleep mode and have each been assigned to a paging group based on the paging cycle requirements. In addition, the mobile stations of paging groups other than paging group one are assigned to paging subgroups. At step 182, the base station (e.g., the BS 104) receives downlink traffic for a mobile station (e.g., the MS 116).

In step 184, the BS 104, using the paging cycle controller 124, identifies the particular paging cluster for the MS 116. That is, the BS 104 must determine the paging group and paging subgroup for the MS 116 so that the paging occurs at the appropriate time.

In step 186, the BS 104 sets a paging flag for the MS 116 to indicate that a paging message should be sent to the MS 116 during the next cycle for the subgroup in which the MS 116 is a member. In step 188, the BS 104 transmits the data for the appropriate cluster thus causing the MS 116 to enter the active or awake mode and the process ends at 190. Alternatively, the ASN gateway 126 (see FIG. 1) may store the cluster information for each mobile station. As previously discussed, in an exemplary implementation of WiMAX, the ASN gateway stores status information (e.g., idle or awake) and the subscriber device ID for each mobile station in the region controlled by the ASN gateway. If downlink traffic arrives for a mobile station that is in the awake mode, the ASN gateway 126 routes the downlink traffic to the base station with which the mobile station is presently registered. If downlink traffic arrives for a mobile station that is presently in the idle mode, the ASN gateway 126 can identify the cluster for the mobile station and send the subscriber device ID to the paging region in which the mobile station is believed to be located. The cluster and subscriber device ID information may be sent in advance to the paging region and stored by the base stations in that paging region until the paging cycle time for the particular cluster has arrived. Alternatively, the ASN gateway 126 may send the subscriber device ID data for those mobile stations in the next paging cluster.

Thus, the paging clusters described herein effectively balance the paging load for any particular paging cycle in the wireless communication network. This minimizes paging cycle overhead thereby increasing overall efficiency.

The foregoing described embodiments depict different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality.

While particular embodiments of the present invention have been shown and described, it will be obvious to those skilled in the art that, based upon the teachings herein, changes and modifications may be made without departing from this invention and its broader aspects and, therefore, the appended claims are to encompass within their scope all such changes and modifications as are within the true spirit and scope of this invention. Furthermore, it is to be understood that the invention is solely defined by the appended claims. It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations).

Accordingly, the invention is not limited except as by the appended claims.

The invention claimed is:

1. A method of establishing paging cycles in a wireless communications system, comprising:
   receiving a paging cycle request from each of the plurality of mobile stations via one or more base stations;
   in response to the paging cycle requests, transmitting commands from the one or more base stations to each of the plurality of mobile stations to:
   assign a first portion of a plurality of mobile stations to a first paging group, wherein mobile stations in the first paging group can be paged in paging cycles at a first time interval between paging cycles;
   assign a second portion of the plurality of mobile stations to a second paging group, wherein mobile stations in the second paging group can be paged in paging cycles at a second time interval between paging cycles, the second time interval being twice the first time interval; and
   assign each of the mobile stations in the second paging group to a first subgroup or a second subgroup, wherein mobile stations in the first subgroup and mobile stations in the second subgroup can be paged in alternating respective ones of the paging cycles together with all of the mobile stations in the first paging group, such that mobile stations in the first subgroup are not paged in the same paging cycle as mobile stations in the second subgroup.

2. The method of claim 1 wherein the first and second subgroups of the second paging group are substantially equal in size.

3. The method of claim 1, further comprising the base station:
   assigning a third portion of the plurality of mobile stations to a third paging group, wherein mobile stations in the third paging group can be paged in paging cycles at a third time interval between paging cycles, the third time interval being four times the first time interval; and
   assigning each of the mobile stations in the third paging group to a selected one of first, second, third and fourth subgroups of the third paging group, wherein paging for the mobile stations in the first subgroup of the third paging group occurs in a first occurrence of the paging cycle and every fourth occurrence of the paging cycle following the first paging cycle, paging for the mobile stations in the second subgroup of the third paging group occurs in a second occurrence of the paging cycle and every fourth occurrence of the paging cycle following the second paging cycle, paging for the mobile stations in the third subgroup of the third paging group occurs in a third occurrence of the paging cycle and every fourth occurrence of the paging cycle following the third paging cycle, and paging for the mobile stations in the fourth subgroup of the third paging group occurs in a fourth occurrence of the paging cycle and every fourth occurrence of the paging cycle following the fourth paging cycle.

4. The method of claim 3 wherein the first, second, third, and fourth subgroups of the third paging group are substantially equal in size.

5. The method of claim 3 wherein the first and second subgroups of the second paging group and the first, second, third, and fourth subgroups of the third paging group are substantially equal in size.

6. The method of claim 3, further comprising forming a first cluster with the mobile stations of the first paging group, the mobile stations of the first subgroup of the second paging group, and the mobile stations in the first subgroup of the third paging group wherein the mobile stations of the first cluster can be paged in a single paging cycle.

7. The method of claim 6, further comprising forming a second cluster with the mobile stations of the first paging group, the mobile stations of the second subgroup of the second paging group, and the mobile stations in the second subgroup of the third paging group wherein the mobile stations of the second cluster can be paged in a single paging cycle different from the paging cycle used for the first cluster.

8. The method of claim 7, further comprising forming a third cluster with the mobile stations of the first paging group, the mobile stations of the first subgroup of the second paging group, and the mobile stations in the third subgroup of the third paging group wherein the mobile stations of the third cluster can be paged in a single paging cycle different from the paging cycles used for the first or second clusters.

9. The method of claim 8, further comprising forming a fourth cluster with the mobile stations of the first paging group, the mobile stations of the second subgroup of the second paging group, and the mobile stations in the fourth subgroup of the third paging group wherein the mobile stations of the fourth cluster can be paged in a single paging cycle different from the paging cycles used for the first, second, or third clusters.

10. The method of claim 9 wherein the first, second, third, and fourth clusters are substantially equal in size.

11. The method of claim 1 wherein assigning mobile stations to the first paging group and assigning mobile stations to the second paging group is based on a mobile station device type.

12. The method of claim 1 wherein assigning mobile stations to the first paging group and assigning mobile stations to the second paging group is based on an application executing on the mobile stations.

13. The method of claim 1 wherein assigning mobile stations to the first paging group and assigning mobile stations to the second paging group is based on a request received from the mobile stations when entering an idle mode.

14. A method comprising:
   assigning a paging cycle time to each of a plurality of mobile stations;
   assigning each of a plurality of mobile stations to one of a plurality of paging groups based on the paging cycle time assigned to each of the plurality of mobile stations;
   assigning each of the plurality of mobile stations within a first of the plurality of paging groups to a selected one of a plurality of subgroups, wherein each of the plurality of mobile stations in the first paging group can be paged at time intervals associated with the first paging group, but wherein each of the plurality of mobile stations in different ones of the plurality of subgroups are paged in different paging cycles.

15. The method of claim 14 wherein a portion of the plurality of mobile stations are assigned a minimum paging cycle time.

16. The method of claim 15 wherein the paging cycle time assigned to the first of the plurality of paging groups is greater than the minimum paging cycle time.

17. The method of claim 15 wherein the paging cycle time assigned to the first of the plurality of paging groups is an integer multiple of the minimum paging cycle time.

18. The method of claim 15 wherein the paging cycle time assigned to the first of the plurality of paging groups is a binary power multiple of the minimum paging cycle time.

19. The method of claim 14 wherein assigning the paging cycle time to each of the plurality of mobile stations comprises assigning the paging time based on a mobile station type.

20. The method of claim 14 wherein assigning the paging cycle time to each of the plurality of mobile stations comprises assigning the paging time based on an application executing on a mobile station.

21. The method of claim 14 wherein assigning the paging cycle time to each of the plurality of mobile stations comprises assigning the paging time based on a request received from the mobile stations when entering an idle mode.

22. The method of claim 14, further comprising assigning each of the plurality of mobile stations within a second of the plurality of paging groups to have a minimum paging cycle time such that the plurality of mobile stations within the second paging group can be paged at every paging cycle.

23. The method of claim 14 wherein the plurality of mobile stations within the second paging group are clustered into a first cluster together with the plurality of mobile stations in a first of the plurality of subgroups of the first paging group such that the mobile stations in the first cluster can be paged in the same paging cycle.

24. The method of claim 23 wherein the plurality of mobile stations within the second paging group are clustered into a second cluster together with the plurality of mobile stations in a second of the plurality of subgroups of the first paging group such that the mobile stations in the second cluster can be paged in the same paging cycle, but in a different paging cycle than the mobile stations in the first cluster.

25. The method of claim 24 wherein the first and second clusters are substantially equal in size.

26. A system for controlling paging cycles in a wireless communication network having a plurality of wireless communication devices, the system comprising:
a plurality of base stations configured to communicate with the plurality of wireless communication devices;
a paging cycle controller associated with at least one of the plurality of base stations, the paging cycle controller being configured to assign a paging cycle time to each of the plurality of mobile stations and to assign each of a plurality of mobile stations to a paging group based on the assigned paging cycle time,
the paging cycle controller further configured to assign each of the plurality of mobile stations within a selected one of the plurality of paging groups to a selected one of a plurality of subgroups, wherein each of the plurality of mobile stations in the selected paging group are paged at time intervals associated with the selected paging group, but wherein each of the plurality of mobile stations in different ones of the plurality of subgroups are paged in different paging cycles.

27. The system of claim 26, further comprising a paging cycle controller associated with each of the base stations.

28. The system of claim 27 wherein the paging cycle controller associated with each of the base stations is configured to assign the paging cycle time, to assign mobile stations to a paging group and to assign mobile stations within a selected one of the plurality of paging groups to a selected one of a plurality of subgroups for mobile stations registered with the respective base station with which the paging cycle controller is associated.

29. The system of claim 26 wherein the paging cycle controller is associated with a plurality of base stations.

30. The system of claim 29 wherein the paging cycle controller associated with the plurality of base stations is configured to assign the paging cycle time, to assign mobile stations to a paging group and to assign mobile stations within a selected one of the plurality of paging groups to a selected one of a plurality of subgroups for mobile stations registered with any of the plurality of base stations with which the paging cycle controller is associated.

31. The system of claim 26 wherein the wireless communication network comprises an access service node (ASN) gateway configured to communicate with the plurality of base stations, the paging cycle controller being implemented as part of the ASN gateway.

32. The system of claim 31 wherein the paging cycle controller implemented as part of the ASN gateway is configured to assign the paging cycle time, to assign mobile stations to a paging group and to assign mobile stations within a selected one of the plurality of paging groups to a selected one of a plurality of subgroups for mobile stations registered with any of the plurality of base stations with which the ASN gateway is configured to communicate.

33. The system of claim 26 wherein the wireless communication network has a minimum paging cycle time and the paging cycle controller is configured to assign the minimum paging cycle time to a first portion of the plurality of mobile stations.

34. The system of claim 33 wherein the paging cycle controller is further configured to assign the paging cycle time greater than the minimum paging cycle time to a second portion of the plurality of mobile stations.

35. The system of claim 34 wherein the paging cycle time greater than the minimum paging cycle time is an integer multiple of the minimum paging cycle time.

36. The system of claim 26 wherein the paging cycle controller is configured to assign the paging cycle time to at least a portion of the plurality of mobile stations based on a mobile station type.

37. The system of claim 26 wherein the paging cycle controller is configured to assign the paging cycle time to at least a portion of the plurality of mobile stations based on an application executing on a mobile station.

38. The system of claim 26 wherein the paging cycle controller is configured to assign the paging cycle time to at least one of the plurality of mobile stations based on a request received from the one mobile station when entering an idle mode.

* * * * *